United States Patent
Brodigan

(10) Patent No.: US 7,386,873 B2
(45) Date of Patent: *Jun. 10, 2008

(54) SYSTEM AND METHOD FOR PROVISIONING A SINGLE PHYSICAL DROP TO ACCOMODATE MULTIPLE DEVICES

(75) Inventor: Daniel L. Brodigan, Westminster, CO (US)

(73) Assignee: Qwest Communications International Inc., Denver, CO (US)

(*) Notice: Subject to any disclaimer, the term of this patent is extended or adjusted under 35 U.S.C. 154(b) by 1057 days.

This patent is subject to a terminal disclaimer.

(21) Appl. No.: 10/199,906

(22) Filed: Jul. 19, 2002

(65) Prior Publication Data
US 2002/0194616 A1 Dec. 19, 2002

Related U.S. Application Data

(63) Continuation of application No. 09/115,749, filed on Jul. 15, 1998, now Pat. No. 6,467,090.

(51) Int. Cl.
*H04N 7/173* (2006.01)

(52) U.S. Cl. .................. 725/119; 725/98; 725/116; 725/118; 725/93; 709/228; 709/229; 709/231

(58) Field of Classification Search ........ 725/117–119, 725/121, 122, 114, 129, 25, 86–87, 91, 93–94, 725/98–99; 709/228–232, 249–250, 238, 709/245; 370/401, 486
See application file for complete search history.

(56) References Cited

U.S. PATENT DOCUMENTS 5,420,923 A 5/1995 Beyers et al.
5,677,905 A * 10/1997 Bigham et al. ........ 370/395.21
5,724,525 A * 3/1998 Beyers et al. ................. 705/40
5,756,280 A 5/1998 Soora et al.
5,917,537 A * 6/1999 Lightfoot et al. ............... 725/4
5,926,478 A * 7/1999 Ghaibeh et al. ....... 370/395.51
6,055,560 A 4/2000 Mills et al.
6,219,355 B1 4/2001 Brodigan
6,289,381 B1 9/2001 Brodigan

OTHER PUBLICATIONS

U.S. Appl. No. 09/115,749, filed Jul. 15, 1998, Brodigan.
U.S. Appl. No. 09/115,752, filed Jul. 15, 1998, Brodigan.

* cited by examiner

*Primary Examiner*—Ngoc Vu
(74) *Attorney, Agent, or Firm*—Townsend and Townsend and Crew LLP

(57) ABSTRACT

A method and system for allowing a plurality of devices at a physical drop to receive access to video and/or data services from a plurality of video/data service providers in a digital broadband network serviced by a telecommunication services provider utilizes a broadcast manager, in communication with the video/data service providers, for transmitting an electronic message in a modified format determined by the telecommunication services provider, wherein the electronic message contains information identifying the physical drop, a type of the device being provisioned a the physical drop, and a maximum number of devices for the device type allowed to receive corresponding service at the physical drop. A broadband digital terminal, in communication with the broadcast manager and the physical port, is programmed to receive the electronic message and store the corresponding information. Upon receiving a sign-on request from a requesting device that is requesting access to one of the video and data services, the broadband digital terminal determines whether the requesting questing device is authorized to access the requested video or data service based on the stored information.

7 Claims, 3 Drawing Sheets

SYSTEM AND METHOD FOR PROVISIONING A SINGLE PHYSICAL DROP TO ACCOMODATE MULTIPLE DEVICES

CROSS-REFERENCE TO RELATED APPLICATIONS

This application is a continuation of commonly assigned U.S. patent application Ser. No. 09/115,749, entitled, "METHOD AND SYSTEM FOR PROVISIONING A SINGLE PHYSICAL BROADBAND DROP TO ACCOMMODATE MULTIPLE DEVICES", filed on Jul. 15, 1998, now U.S. Pat. No. 6,467,090 by Donald L. Brodigan, the entirety of which application is incorporated herein by reference for all purposes. This application is related to commonly assigned U.S. patent application Ser. No. 09/115,752, entitled, "METHOD AND SYSTEM FOR PROVISIONING A SINGLE PHYSICAL BROADBAND DROP TO ACCOMMODATE MULTIPLE SPECIFIC DEVICES", filed on Jul. 15, 1998, now U.S. Pat. No. 6,526,582 by Donald L. Brodigan, and to commonly assigned U.S. patent application Ser. No. 10/199,598, entitled, "METHOD AND SYSTEM FOR PROVISIONING A SINGLE PHYSICAL BROADBAND DROP TO ACCOMMODATE MULTIPLE SPECIFIC DEVICES", filed on Jul. 19, 2002, now U.S. Pat. No. 7,299,488 by Donald L. Brodigan, which is a continuation of U.S. patent application Ser. No. 09/115,752, the entirety of which applications are incorporated herein by reference for all purposes.

TECHNICAL FIELD

This invention relates to methods and systems for provisioning a single physical broadband drop to accommodate multiple devices without preregistration of the devices.

BACKGROUND ART

Existing cable TV networks utilize a Hybrid Fiber Coaxial ("HFC") architecture that includes a fiber coaxial distribution network similar to a tree and branch architecture. All video channels are sent to this HFC network for distribution throughout the network. The cable TV service provider has a controller at the headend that is connected to the HFC network and another connection through a Business System Interface ("BSI") to a company that provides the platform form for the service provider for provisioning the video service for the cable TV's customers.

Provisioning commands are sent from the platform company to the controller including a media access control ("MAC") address of the customer's set-top-box ("STB"), which is purchased or leased from the service provider, and the entitlements the customer has subscribed to. The controller then broadcasts this provisioning information over the HFC network to the STB having the MAC address specified in the provisioning command. The customer's STB must be attached to the network in order for it to receive the entitlements it has subscribed to. Thus, the STB can be anywhere on the network since it is not associated with a single physical drop corresponding to the customer's home/place of business. Furthermore, anyone capable of duplicating the MAC address of the customer's STB can receive free service.

Some cable TV operators have chosen to use interdiction devices on their HFC network which eliminates the need for the customer to have an STB. The interdiction devices, located at a pedestal serving several homes, are provisioned from a controller at the headend for entitlements based on a physical drop. Any cable-ready TV connected to the drop is capable of receiving and viewing the provisioned entitlements. All other channels are filtered or modified at the interdiction device so that they cannot be view on that physical drop.

Interdiction devices, however, have several drawbacks. First, they are designed for analog cable TV and do not support digital MPEG video. Second, interdiction devices are designed for a single cable TV network serving the customer. Thus, multiple video/data service providers are not supported. And third, all devices on the physical drop associated with the corresponding interdiction device receive all the unfiltered channels and entitlements. There is no ability to allow each device to have its own specific entitlements.

Today's digital broadband architecture allows for multiple service providers to serve a single customer belonging to a video/data network. However, as with the traditional cable TV network, video/data entitlements can be provisioned for a single device. That device can be located anywhere in the network, yet still be able to receive the provisioned entitlements thereby opening the door for theft of services, especially if the MAC address of the device can be duplicated by an unauthorized customer. Furthermore, the customer must have the device at the time of purchasing the video/data entitlements. A new or replacement device must be handled via a service order written to deactivate the old device and activate the new device.

Thus, there exists a need for a method of provisioning a physical drop to allow a customer to obtain access to video/data services based on the customer's address in a digital broadband architecture that overcomes the disadvantages encountered by the known prior art.

DISCLOSURE OF THE INVENTION

It is therefore a general object of the present invention to provide a method and system for provisioning a single physical drop in a digital broadband architecture that allows a customer to obtain access to video/data services based on the customer's address.

It is another object of the present invention to provide a method and system for provisioning a single physical drop to be able to obtain access to various video and data suppliers based on the customer's address.

It is yet another object of the present invention to provide a method and system for provisioning a single physical drop so as to allow any device on the physical drop to receive video and/or data services.

In carrying out the above objects and other objects, features, and advantages of the present invention, a method is provided for allowing a plurality of devices at a physical drop to receive access to video and/or data services from a plurality of video/data service providers in a digital broadband network serviced by a telecommunication services provider wherein the plurality of service providers normally communicate with the telecommunication services provider utilizing electronic messages having predetermined formats as defined in a communications protocol. The method includes transmitting a first electronic message in a modified format determined by the telecommunication services provider and containing first information identifying the physical drop, a type of the device being provisioned at the physical drop, and a maximum number of devices for the device type allowed to receive corresponding service at the physical drop, storing the first information at a location servicing the physical drop, and upon receiving a sign-on request from a requesting device that is requesting access to one of the video and data services, determining whether the requesting device is authorized to access the requested video or data service based on the stored first information.

In further carrying out the above objects and other objects, features, and advantages of the present invention, a system is also provided for carrying out the steps of the above described method. The system includes a broadcast manager, in communication with the video and data service providers, for transmitting a first electronic message in a modified format determined by the telecommunication services provider wherein the first electronic message contains first information identifying the physical drop, a type of the device being provisioned at the physical drop, and a maximum number of devices for the device type allowed to receive corresponding service at the physical drop. The system further includes a broadband digital terminal, in communication with the broadcast manager and the physical port, which is programmed to receive the first electronic message, store the first information at a location servicing the physical drop, and upon receiving a sign-on request from a requesting device that is requesting access to one of the video and data services, determine whether the requesting device is authorized to access the requested video or data service based on the stored first information.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
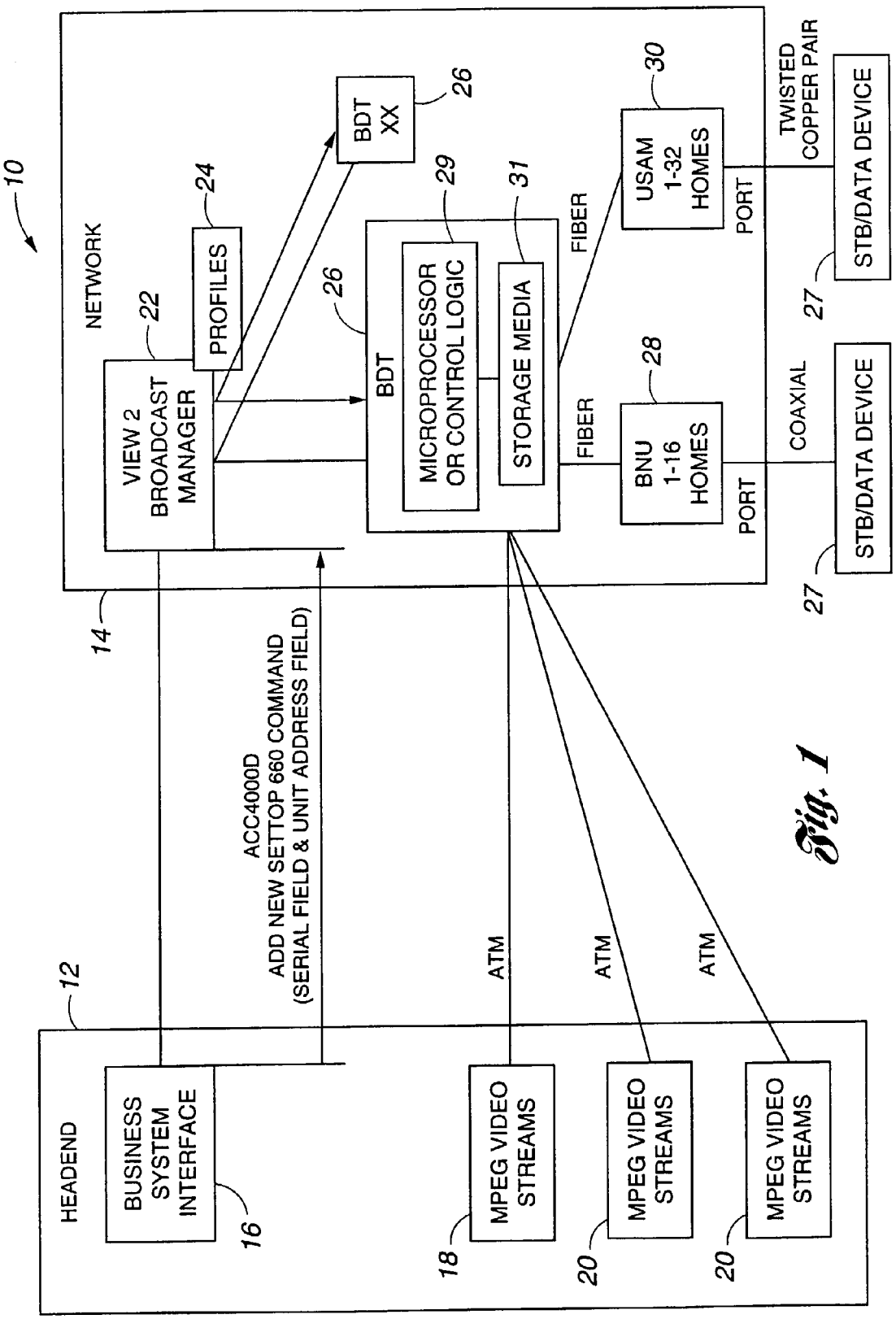
FIG. 1 is a block diagram of the system of the present invention.

FIG. 1 is a block diagram illustrating the system of the present invention, denoted generally by reference numeral 10. The system 10 includes a headend portion 12 and a network portion 14. The headend 12 includes a Business System Interface ("BSI") 16 for interconnecting the network 14 with a platform company serving a service provider. The BSI 16 sends provisioning commands to the network 14 utilizing a predetermined format/protocol.

The headend 12 further includes video service providers 18 that provide motion video/audio data encoded according to MPEG 1 and 2 video encoding standards. Examples of video service providers 18 include satellite MPEG 2 video delivery (DSS Satellite and Primestar) as well as other cable companies moving towards digital cable TV technology.

Data service providers 20 are also included in the headend 12 for providing data services. Data service providers may include service providers such as America On-Line, Prodigy, Microsoft Network, MCI, and other internet and intranet data service providers as well as corporate data service providers.

The network 14 includes a View 2 Broadcast Manager 22 in communication with the BSI 16 for receiving the provisioning commands and managing video and high speed data access at a customer's physical drop. Upon receiving a provisioning command from the BSI 16, the broadcast manager 22 creates a customer profile 24 that identifies the video channel entitlements that are associated with a specific physical drop serving a residence or business. In the case of data services, the profile 24 is used to identify the data service provider 20. Asynchronous Transfer Mode (ATM) is used between the customer and the data service provider 20 so as to provide a private line-like connection.

Video/data entitlements are then provisioned through the broadcast manager 22 to a Broadband Digital Terminal ("BDT") 26 serving the customer. The network 14 preferably includes a plurality of BDTs 26, each of which serve a plurality of customers. The number of customers served is dependent upon the actual vendor's equipment. The BDT 26 is coupled to the video and data service providers 18 and 20 so that multiple video and data service providers can be served on a shared transport. Data is established from the customer's physical drop through the BDT 26 to a data network and then to the appropriate data service provider 20. In the case of video, the video service provider 18 sends MPEG video through the data network to the BDT 26. The customer selects a channel from their STB 27 to the BDT 26 to select the video channel they want to watch, but is restricted to the channel entitlements provisioned in their profile 24. Thus, the BDT 26 is responsible for switching the video and data provided by the video and data service providers 18, 20 to the appropriate physical drop based on the provisioned profile 24 transferred from the broadcast manager 22.

Each of the BDTs 26 includes a microprocessor 29 in communication with various computer readable storage media 31. Computer-readable storage media 31 may include various types of media or memories and may be implemented utilizing any of a number of known hardware devices such as flash memory, PROMs, EEPROMs, and other electrical, electromagnetic, and optical storage devices capable of storing data representing instructions executable by a computer. As is known, computer-readable media 31 contain various program instructions, software, or control logic to affect access to the service providers 18, 20. Microprocessor 29 executes various instructions to generate output signals to each of the service providers 18, 20 based on signals received from the devices 27 via a Broadband Network Unit ("BNU") 28 or a Universal Service Access Multiplexer ("USAM") 30, as described below.

Each of the BDTs 26 are coupled to either a BNU 28 or a USAM 30. The BNU 28 is a physical unit that is placed in the serving neighborhood and is connected to the BDT 26 via a single fiber link. Typically, the BNU 28 serves up to 16 homes or physical drops. A coaxial cable is run from a port (#1-16) on the BNU 28 to the home or business so that multiple devices on a single physical drop can have different entitlements. A twisted copper pair running between the BNU 28 and a home or business provides telephone service.

The USAM 30 performs the same function as the BNU 28, but combines the video and data service on the same twisted copper pair as the voice, or telephone, service. By providing video/data and voice on a single pair of wires to the customer, the total customers served is increased from 16 to 32.

Figure 2:
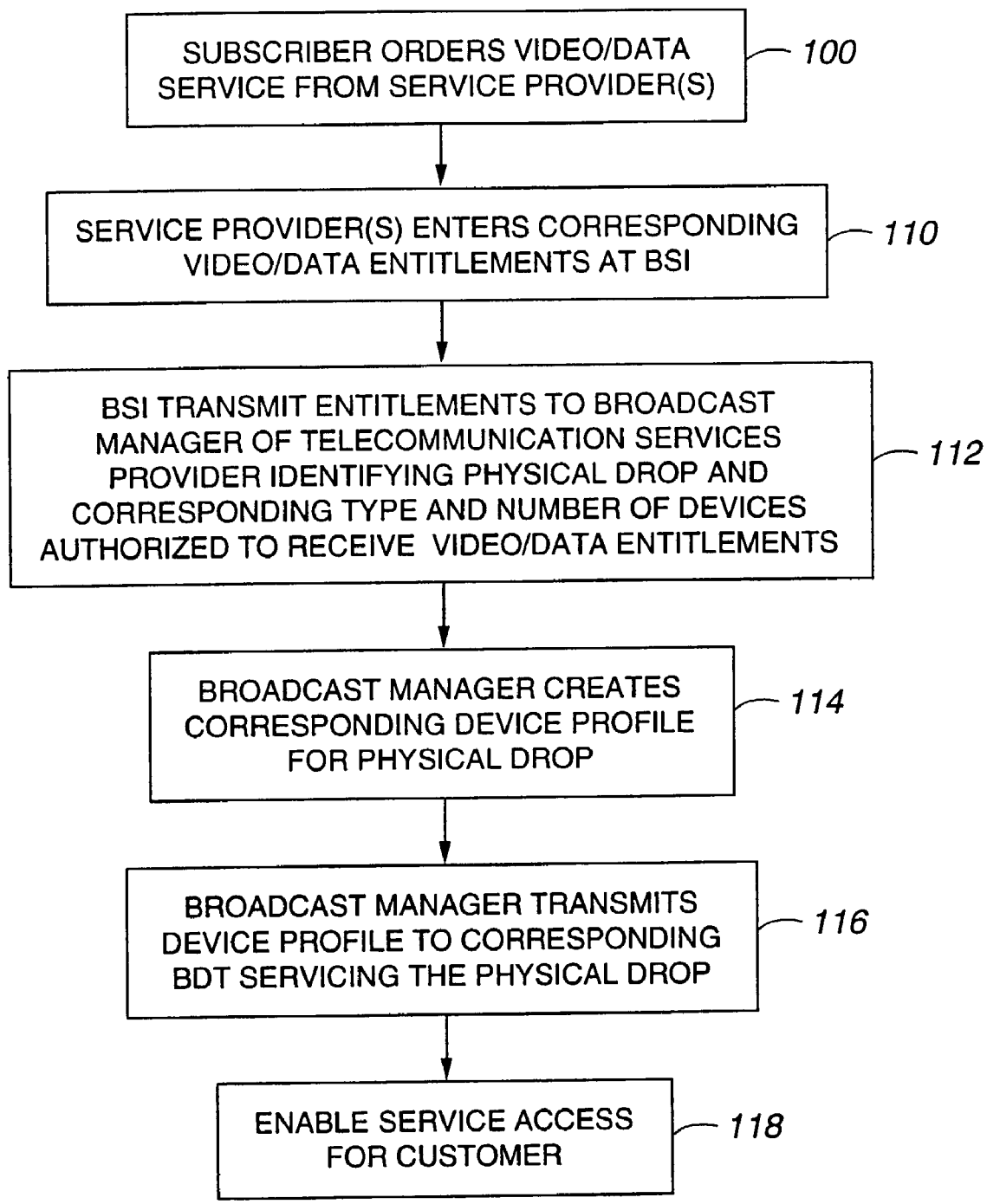
FIG. 2 is a flow diagram illustrating the general sequence of steps associated with the provisioning process of the present invention.

Turning now to FIG. 2, there is shown a flow diagram illustrating the general sequence of steps associated with the provisioning process of the present invention. First, the customer orders video and/or data service from one of many video/data service providers servicing the customer's area, as shown at block 100. At this time, the customer provides the video/data service provider(s) with one or more devices, or STBs, for which she would like provisioned. Each device has a specific MAC address so that each device can be separately identified.

The video or data service provider then enters the video/data entitlements in the BSI 16, as shown at block 110. At block 112, the BSI 16 then transmits the entitlements to the broadcast manager 22 identifying the physical drop to be provisioned. This information is preferably transmitted utilizing the existing Jerrold communication protocol, specifically the Add New Settop 660 command. The Add New Settop 660 command is utilized to add a new digital settop box and authorize/deauthorize services for the settop box. This command contains the following fields in addition to the STX, the packet header, the Checksum field, and the ETX:

| Field | Format |
| --- | --- |
| BSI_Code | 16-bit unsigned integer |
| Headend_Number | 16-bit unsigned integer |
| Equip_Type | 16-bit unsigned integer |
| Equip_Sub_Type | 16-bit unsigned integer |
| Serial_Number | 12-character alphanumeric |
| Unit_Address | 16-character alphanumeric |
| Init_Flag | 8-bit unsigned integer |
| Num_Changed_Services | 16-bit unsigned integer |
| Service_Handle | 32-bit unsigned integer |

The BSI_Code and Headend_Number identify the video or data service provider. The Equip_Type and Equip_Sub_Type codes identify the specific manufacturer, model number, and software release of the STB or data device being provisioned. The Serial_Number field identifies the MAC address of the STB/data device. The Service_Handle field is used to specify the video or data entitlements the customer has subscribed to. The Unit_Address field specifies the unit address assigned to the STB/data device by the manufacturer. Although these fields specify entitlements provisioned for a specific STB/data device, none of them, alone or together, provide information so as to insure that the STB/data device is at the authorized physical drop and, if applicable, one of many devices authorized on the physical drop.

Therefore, in the present invention, both the Unit_Address field and the Serial_Number field are modified to identify the customer's address, while the actual entitlements remain controlled by the code in the Service_Handle field. The Unit_Address is modified as follows:

xx xxxx xxxxxx xxx xx where,
the first 2 Octet=State code identifying the state in which the service is being provided;
the next 4 Octet=Common Language Circuit Identifier ("CLCI") identifying the serving wire center;
the next 6 Octet=BDT/BNU/Port identifying the physical location of the customer's broadband drop;
the next 3 Octet=Service Wire Center identifying the central office that provides dialtone to the physical drop; and
the next 2 Octet=a fixed value, e.g., U, due to limited field length, but could be used for other features in the future.

The Serial_Number field is modified as follows:

xx xx xx xxx x x x where,
the first 2 Octet=BDT servicing the physical drop;
the next 2 Octet=BNU/USAM number servicing the physical drop;
the next 2 Octet=Port corresponding to physical drop;
the next 3 Octet=Service Wire Center identifying the central office that provides dialtone to the physical drop;
the next 1 Octet=Device Type, 0 for Video and 1 for Data; and
the next 2 Octet=Number of active simultaneous devices allowed on the single physical drop. Each active simultaneous device is identified at sign-on by the DAVIC 1.2 Specification Part 8. Profile A, 7.6.2.1.4 Downstream Frame Header Byte 7 defines the Data Link Address Value. The Data Link Address provides a Device ID value range from 0 to 15. 0 is used by all users devices (broadcast). If the Device ID is 15, the Data Link command shall not be interpreted by any user device. This provides for a maximum of 14 different devices addresses that can be used at the same time on a single physical broadband drop.

In the preferred embodiment, the maximum active video devices is limited to six. A single physical device may support multiple MPEG decoders. When a device logs onto the BDT 26, it is identified by the Equip_Type in a sign on request, described below. The Equip_Type is used to identify the support of data on that device and/or the number of MPEG decoders supported on that device. If a device attempts to sign onto the network after the maximum device number has been reached, a negative acknowledgment will be sent back identifying that the network resources have been exceeded. If a customer still wants a new box to be active they must power down one of the other active devices prior to turning on the new device. If the number of active devices allowed is decreased in the future and the actual number of active devices exceed the new number, all devices will be logged off by the BDT 26. Each device must then re-sign on. When the maximum number of devices reaches the new maximum number, any further sign on requests will be denied with a negative acknowledgment sent back identifying that the network resources have been exceeded.

The Serial_Number field duplicates the BDT, BNU/USAM number, Port, and Service Wire Center coded in the Unit_Address field. The purpose of this coding is different from that of the Unit_Address field. If changes are required at a later date to specify the number of active devices for Data or Channel entitlements for Video, a Change Settop Service 662 command will be sent from the Service Provider Business System Interface 16 to the broadcast manager 22. The Change Settop 662 command does not have the Unit_Address Field, so this coding is used to inform broadcast manager 22 of the physical drop profile being modified. If both Video and Data device profiles were provisioned on the same physical drop, it would also use the Device type coding to insure that the right profile is being modified.

The duplication of some of the Unit_Address field in the Serial_Number field is also required to provide the ability to delete or remove a provisioned profile. The Delete Digital Settop (663) command does not have the Unit_Address Field and requires the coding of the Serial_Number field to contain the physical drop identification as well as Device type Video/Data to insure the right profile is being deleted A single physical drop will only have one of these profiles for video or data. Thus, a physical drop will support both a video profile and a data profile at the same time.

Upon receiving the video/data entitlements, the broadcast manager creates a device profile for the customer's physical drop, as shown at block 114. The device profile includes service provider information, entitlements, device type (or equipment type), physical drop identification information, i.e., BDT, BNU/USAM and Port, device type, i.e., video or data, and number of active devices allowed.

A physical broadband drop can support multiple types of device profiles. That is, the physical drop may be provisioned to support a device specific profile identifying a specific device entitled to receive video/data services, as described in application entitled "Method and System For Provisioning A Single Physical Broadband Drop To Accommodate Multiple Specific Devices," having Ser. No. 09/115,752, which is hereby incorporated in its entirety. For this type of device specific profile, only the Unit_Address field is modified, while the Serial_Number field is unchanged to include the MAC address of the specific device. The physical drop may also be provisioned to support a self-discovery profile, as provided by the present invention, in which both the Unit_Address field and the Serial_Number field are changed so that any pre-approved approved device may receive corresponding video/data services.

The device profiles are then transmitted by the broadcast manager 22 to the appropriate BDT 26 identified in the Unit_Address and Serial_Number fields, as shown at block 116. The BDT 26 identified in the Unit_Address and Serial_Number fields correspond to the BDT 26 serving the customer's home or place of business. Finally, access to the video/data service subscribed to by the customer is enabled, as shown at block 118.

Figure 3:
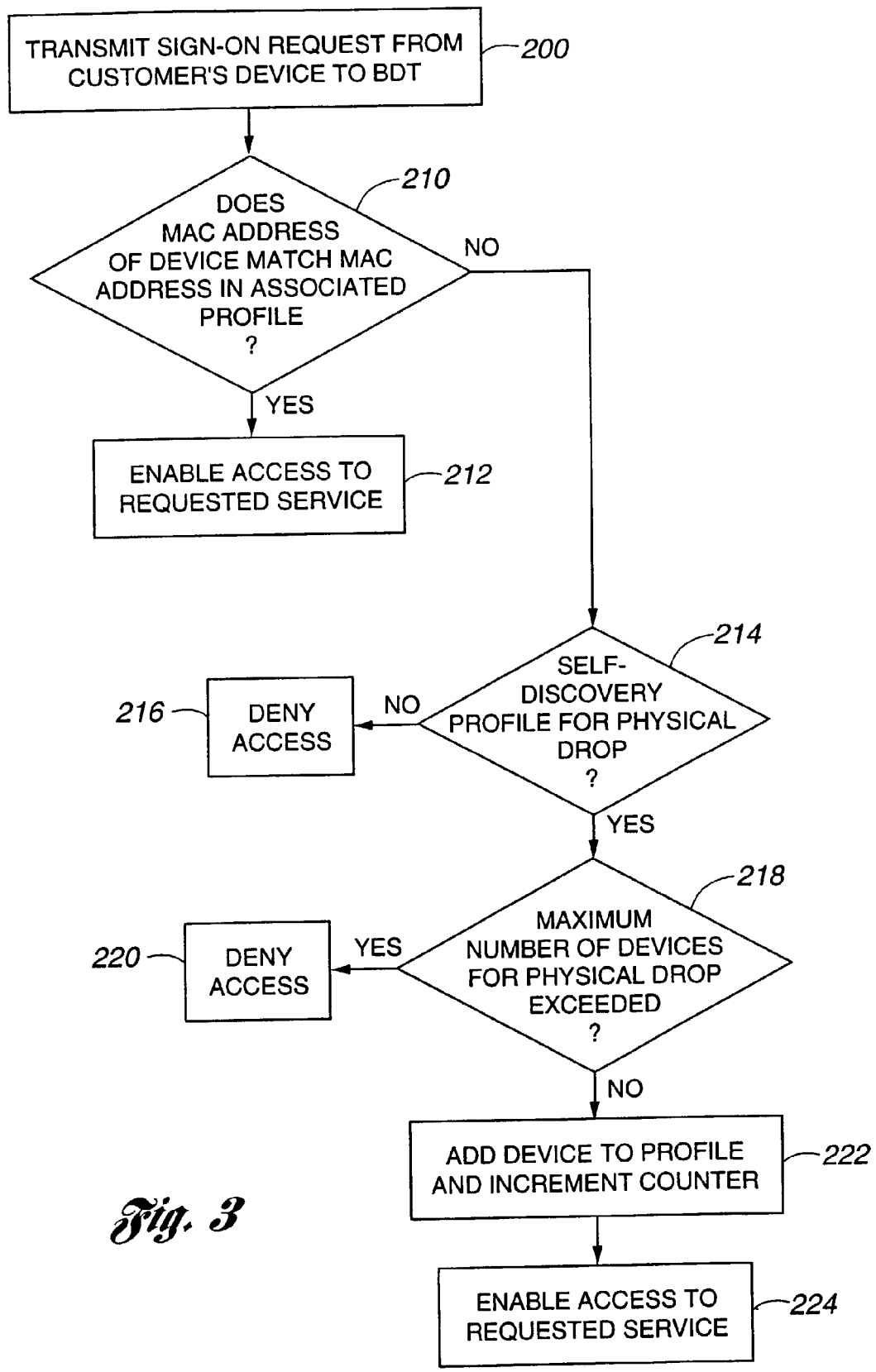
FIG. 3 is a flow diagram illustrating the general sequence of steps associated with the sign-on process of the present invention.

Thus, the BDT 26 stores the device profile(s) associated with a single physical drop for use in allowing the customer to gain access to the subscribed services. This process is further illustrated in the flow diagram of FIG. 3. The device 27 uses the DAVIC 1.2 Interface Initialization Protocol (DiiP) to register with the network 14. Upon activating the device 27, the device transmits a sign-on request, including the MAC address of the device 27, to the BDT 26, as shown at block 200.

When the BDT 26 receives the sign-on request(s) from the device 27, the BDT 26 looks in a table for a device profile associated with the physical drop from which the sign-on request originated to determine if the MAC address of the requesting device matches a MAC address stored in a device profile, as shown at block 210. If there is a match, the device 27 is given access to the requested services, as shown at block 212.

If the MAC address does not match a pre-provisioned MAC address profile, the BDT 26 determines whether a self-discovery profile has been established for the physical drop, as shown at block 214. If not, access to the requested video/data services is denied, as shown at block 216. If, on the other hand, a self-discovery profile is established, the method proceeds to determine if the maximum number of devices for the physical drop is exceeded, as represented at conditional block 218. If so, access is denied.

If the maximum number of devices is not exceeded, the device is added to the MAC address profile, i.e., device specific profile, as shown at block 222. A device counter is incremented at this time. Finally, at block 224, the device is given access to the requested video/data service.

While the best modes for carrying out the invention have been described in detail, those familiar with the art to which this invention relates will recognize various alternative designs and embodiments for practicing the invention as defined by the following claims.

What is claimed is:

1. A method of provisioning a plurality of devices at a single physical drop to receive telecommunications services, comprising:
   receiving at a network an electronic message from a head end, wherein the electronic message comprises:
      a first information field that specifies telecommunication services which the devices at the single physical drop are entitled to receive; and
      a second information field that comprises, in modified format, information that identifies the single physical drop, wherein the second information field comprises a modified version of a Unit_Address field of an Add New Settop command of the Jerrold communication protocol;
   creating a device profile associated with the single physical drop corresponding to the electronic message; and
   storing the device profile.

2. The method of claim 1, wherein the electronic message further comprises a third information field that comprises a media access control (MAC) address of one of the plurality of devices.

3. The method of claim 2, wherein the third information field comprises a Serial_Number field of an Add New Settop command of the Jerrold communication protocol.

4. The method of claim 2, further comprising:
   receiving, from a device at the single physical drop, a request to access telecommunication services, wherein the request includes a MAC address of the device; and
   checking the device profile associated with the single physical drop for the MAC address.

5. A system for provisioning a plurality of devices at a single physical drop to receive telecommunications services, comprising:
   a network, wherein the network comprises:
      a broadcast manager that receives from a Business System Interface, an electronic message relating to an Add New Settop command of the Jerrold communication protocol, wherein the electronic message comprises:
         a Service_Handle field that specifies telecommunication services which the plurality of devices at the single physical drop are entitled to receive; and
         a Unit_Address field that comprises, in modified format, information that identifies the single physical drop;
      a Broadband Digital Terminal operable to create a device profile associated with the single physical drop corresponding to the electronic message; and
      a storage arrangement that stores the device profile.

6. The system of claim 5, wherein the electronic message further comprises a Serial_Number field that comprises a media access control (MAC) address of one of the plurality of devices.

7. The system of claim 6, wherein the Broadband Digital Terminal is further operable to receive, from a device at the single physical drop, a request to access telecommunication services, wherein the request includes a MAC address of the device; and
   wherein the Broadband Digital Terminal is further operable to check the device profile associated with the single physical drop for the MAC address.

* * * * *